(12) United States Patent
Card, II et al.

(10) Patent No.: US 9,258,527 B2
(45) Date of Patent: Feb. 9, 2016

(54) HANDLING OF INFORMATION GENERATED WITHIN A RECEIVER OF A BROADCAST COMMUNICATION SYSTEM

(75) Inventors: John A. Card, II, Denver, CO (US); Timothy M. Kelly, Highlands Ranch, CO (US)

(73) Assignee: EchoStar Technologies L.L.C., Englewood, CO (US)

(*) Notice: Subject to any disclaimer, the term of this patent is extended or adjusted under 35 U.S.C. 154(b) by 821 days.

(21) Appl. No.: 12/261,662

(22) Filed: Oct. 30, 2008

(65) Prior Publication Data

US 2009/0113493 A1    Apr. 30, 2009

Related U.S. Application Data

(60) Provisional application No. 60/984,243, filed on Oct. 31, 2007.

(51) Int. Cl.

| | | |
|---|---|---|
| H04H 60/32 | (2008.01) | |
| H04N 7/16 | (2011.01) | |
| H04N 7/173 | (2011.01) | |
| H04N 21/472 | (2011.01) | |
| H04N 21/475 | (2011.01) | |
| H04N 21/61 | (2011.01) | |

(52) U.S. Cl.
CPC ........... *H04N 7/163* (2013.01); *H04N 7/17318* (2013.01); *H04N 21/475* (2013.01); *H04N 21/47211* (2013.01); *H04N 21/6143* (2013.01); *H04N 21/6175* (2013.01); *H04N 21/6187* (2013.01)

(58) Field of Classification Search
CPC .......... H04N 21/47211; H04N 21/475; H04N 21/6143; H04N 21/6175; H04N 21/6187; H04N 7/163; H04N 7/17318
See application file for complete search history.

(56) References Cited

U.S. PATENT DOCUMENTS

| | | | | |
|---|---|---|---|---|
| 6,124,877 | A * | 9/2000 | Schmidt | 725/10 |
| 7,120,922 | B2 * | 10/2006 | Rodriguez et al. | 725/39 |
| 7,814,144 | B2 * | 10/2010 | Koyama et al. | 709/203 |

* cited by examiner

*Primary Examiner* — Oschta Montoya
(74) *Attorney, Agent, or Firm* — Lowe Graham Jones PLLC

(57) ABSTRACT

A broadcast communication system is presented which includes a broadcast communication transmitter, a broadcast communication receiver, and an information processor. The broadcast communication receiver is configured to receive programming from the broadcast communication transmitter. The receiver is also configured to generate information relating to the operation of the broadcast communicate receiver. In addition, the receiver is configured to connect to the information processor and transfer the information thereto during a time period in accordance with user input accepted by the receiver. The information processor is configured to receive and process the information.

20 Claims, 4 Drawing Sheets

HANDLING OF INFORMATION GENERATED WITHIN A RECEIVER OF A BROADCAST COMMUNICATION SYSTEM

CROSS-REFERENCE TO RELATED APPLICATIONS

This application claims the benefit of U.S. Provisional Application No. 60/984,243, entitled "HANDLING OF INFORMATION GENERATED WITHIN A RECEIVER OF A BROADCAST COMMUNICATION SYSTEM" and filed Oct. 31, 2007, which is hereby incorporated herein by reference in its entirety.

BACKGROUND

Satellite broadcast communication systems, such as direct broadcast satellite (DBS) and satellite radio systems, typically are designed to transfer information primarily in one direction. For example, entertainment and news programming, program schedule information, and the like are normally transferred from a satellite uplink center through a satellite to a receiver, such as a satellite set-top box, located at a business or residential location.

At times, however, information generated in the satellite receiver must be relayed from the satellite receiver to some portion of the satellite broadcast communication system. For example, many satellite set-top box units allow a subscriber to order pay-per-view (PPV) events, such as major sporting events, music concerts, popular motion pictures, and the like, by way of a remote control unit accessing a control menu provided by the set-top box through a connected television set. Such information is often transferred through a terrestrial telephone connection between the set-top box and a back-end processing system configured to receive and process such information. In the case of a PPV order, the processing system then causes the communication system to download the requested programming (if prerecorded) or stream the programming (if presented live) to the receiver unit. The processing system also causes a charge for the requested event to be added to the subscriber's bill.

In the case of a receiver being located at a residence, the phone connection employed to transfer the information from the receiver to the processing system is typically the primary phone connection for the residence. Thus, the receiver does not stay connected at all times to the processing system, as such a permanent coupling would prevent the phone connection from being utilized for normal telephone communication and other uses. Instead, the receiver unit is normally configured to store the information temporarily, and then periodically connect by way of the phone connection to the processing system to transfer the stored information. The receiver normally makes such connections at times when the telephone connection is not likely to be employed for normal use, such as at noon during the week (when the subscriber is likely to be at work and, hence, not at home) or at midnight (when the residents are expected to be asleep).

Some subscribers may prefer that the connection between the receiver and the processing system be made at times other than those determined by the receiver. For example, the subscriber's use patterns involving the available phone connection may conflict with the connection times employed by the receiver. In another situation, the terms of a subscriber's phone service plan may allow for less expensive calls during times not being utilized by the receiver. Moreover, the use patterns and phone plan terms may change over a period of weeks or months.

BRIEF DESCRIPTION OF THE DRAWINGS

Many aspects of the present disclosure may be better understood with reference to the following drawings. The components in the drawings are not necessarily depicted to scale, as emphasis is instead placed upon clear illustration of the principles of the disclosure. Moreover, in the drawings, like reference numerals designate corresponding parts throughout the several views. Also, while several embodiments are described in connection with these drawings, the disclosure is not limited to the embodiments disclosed herein. On the contrary, the intent is to cover all alternatives, modifications, and equivalents.

DETAILED DESCRIPTION

The enclosed drawings and the following description depict specific embodiments of the invention to teach those skilled in the art how to make and use the best mode of the invention. For the purpose of teaching inventive principles, some conventional aspects have been simplified or omitted. Those skilled in the art will appreciate variations of these embodiments that fall within the scope of the invention. Those skilled in the art will also appreciate that the features described below can be combined in various ways to form multiple embodiments of the invention. As a result, the invention is not limited to the specific embodiments described below, but only by the claims and their equivalents.

Figure 1:
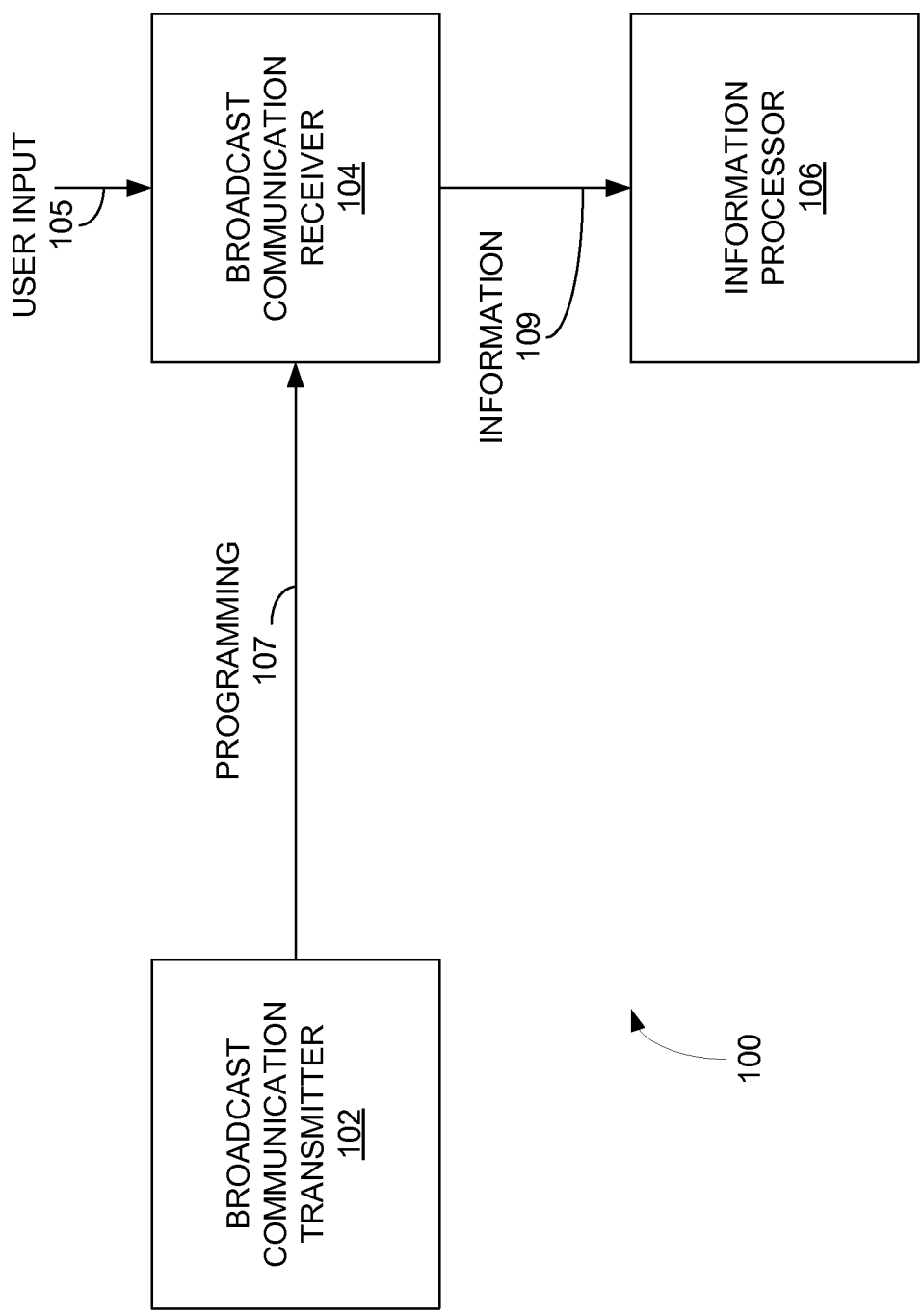
FIG. 1 is a block diagram of a broadcast communication system according to an embodiment of the invention.

FIG. 1 presents a block diagram of a broadcast communication system 100 according to an embodiment of the invention. The system 100 includes a broadcast communication transmitter 102, a broadcast communication receiver 104 and an information processor 106. The broadcast communication transmitter 102 is configured to transmit programming 107, while the broadcast communication receiver 104 is configured to receive the programming 107. The receiver 104 is also configured to generate information 109 relating to the operation of the receiver 104. Further, the receiver 104 is configured to receive a user input 105 indicating a connection time restriction. The receiver 104 is also configured to connect to the information processor 106 and transfer the information 109 to the information processor 106 in accordance with the connection time restriction.

Figure 2:
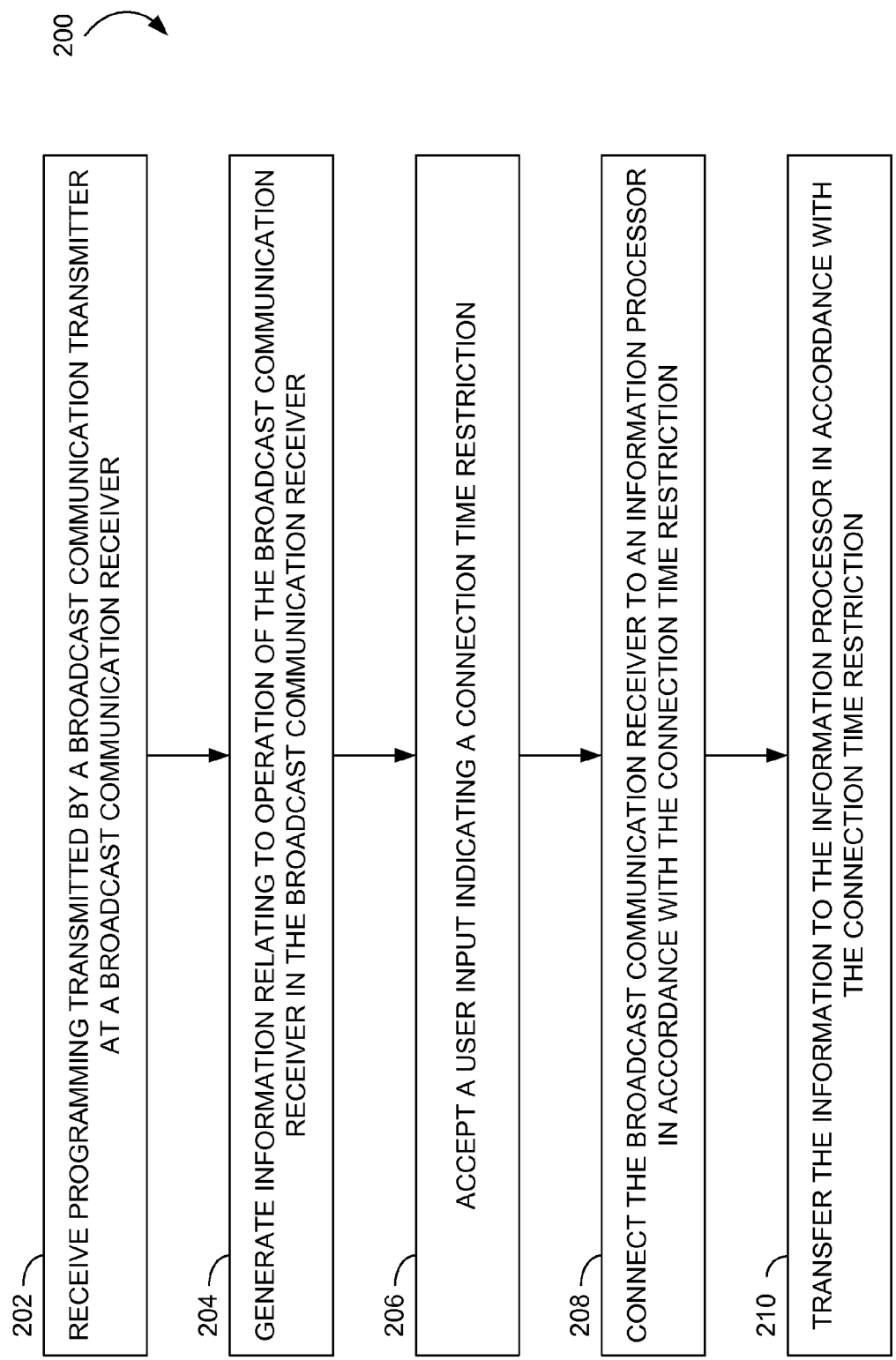
FIG. 2 is a flow diagram of a method according to an embodiment of the invention for handling information generated within a broadcast communication receiver.

Another embodiment—a method 200 for handling information generated with a broadcast communication receiver—is depicted by way of a flow diagram in FIG. 2. In the method 200, programming transmitted by a broadcast communication transmitter is received at the broadcast communication receiver (operation 202). Information relating to operation of the broadcast communication receiver is generated in the receiver (operation 204). A user input indicating a connection time restriction is accepted at the receiver (operation 206). The broadcast communication receiver is connected to an information processor (operation 208) and the information is transferred to the information processor (operation 210) in accordance with the connection time restriction. While FIG. 2 presents a particular sequence of the operations 202-210, other orders of execution of the operations 202-210, including concurrent or simultaneous execution of one or more of the operations 202-210, are also possible in other embodiments while remaining within the scope of the invention. In another example, a computer-readable medium includes instructions executable by a processor for executing the operations 202-210 of the method 200.

Figure 3:
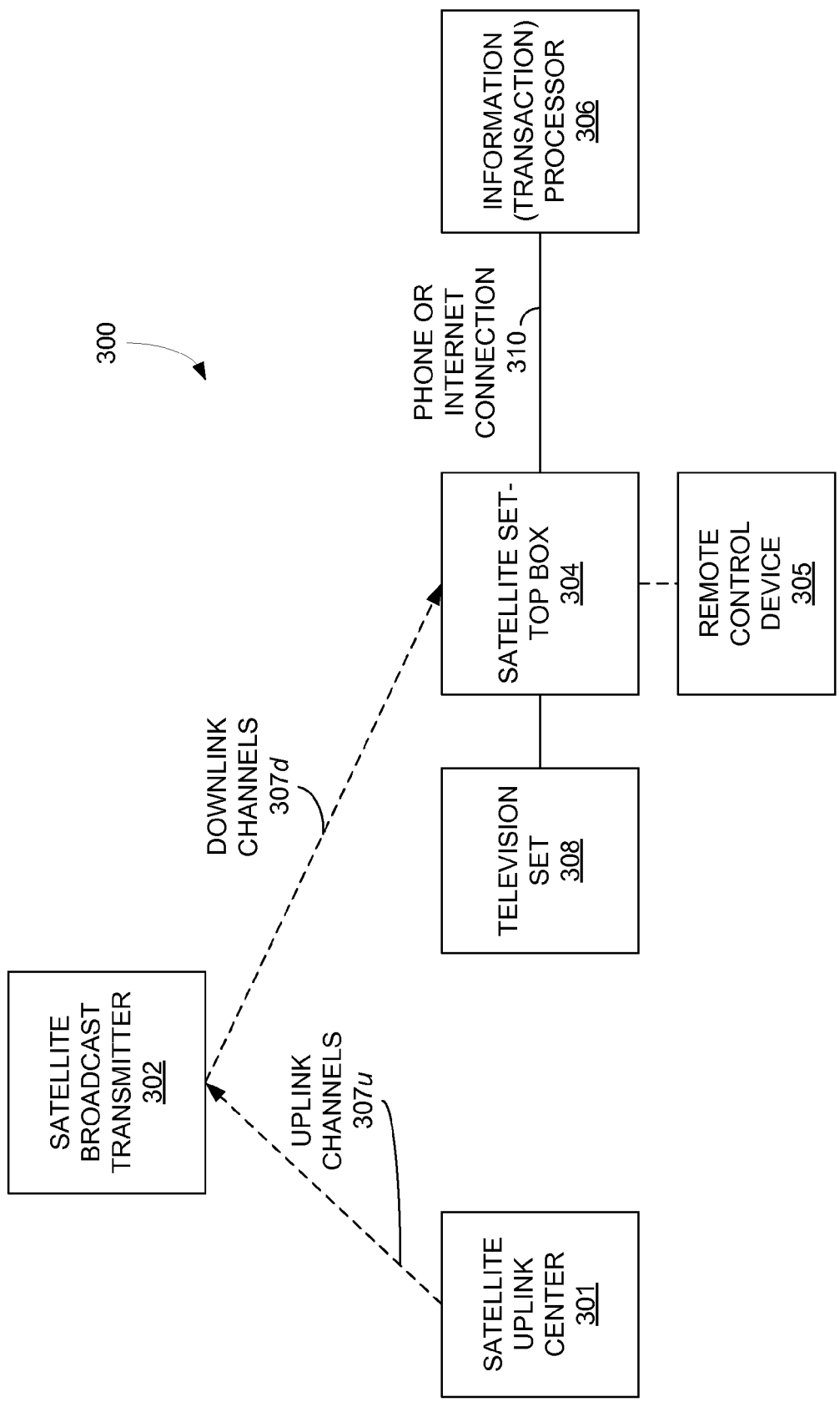
FIG. 3 is a block diagram of a satellite broadcast communication system according to an embodiment of the invention.

FIG. 3 depicts by way of a block diagram a satellite television broadcast communication system 300 according to another embodiment of the invention. The communication system 300 includes a satellite uplink center 301, a satellite broadcast transmitter 302, a satellite set-top box 304 with a remote control device 305, and an information or transaction processor 306. In addition, the satellite set-top box 304 is coupled with a television set 308. While FIG. 3 specifically depicts a satellite television broadcast communication system 300, other embodiments may be incorporated within a satellite radio broadcast communication system, a cable television broadcast communication system, a terrestrial ("over-the-air") broadcast communication system, or other type of broadcast communication system.

The uplink center 301 typically receives programming from a number of programming sources (not shown in FIG. 3) and wirelessly transmits the programming to the satellite transmitter 302 over one or more uplink channels 307u. In turn, the programming is transmitted by way of one or more transponders within the satellite 302 over one or more downlink channels 307d to the satellite set-top box 304. Typically, a multitude of set-top boxes receive the same programming over the same downlink channels 307d, but only one set-top box 304 is shown in FIG. 3 to simplify the discussion presented below. Ordinarily, the satellite transmitter 302 is located in a geosynchronous orbit above the Earth to allow the set-top box 304 to employ an antenna (not shown in FIG. 3) directed at a fixed point in the sky to receive the downlink channels 307d from the satellite transmitter 302.

Figure 4:
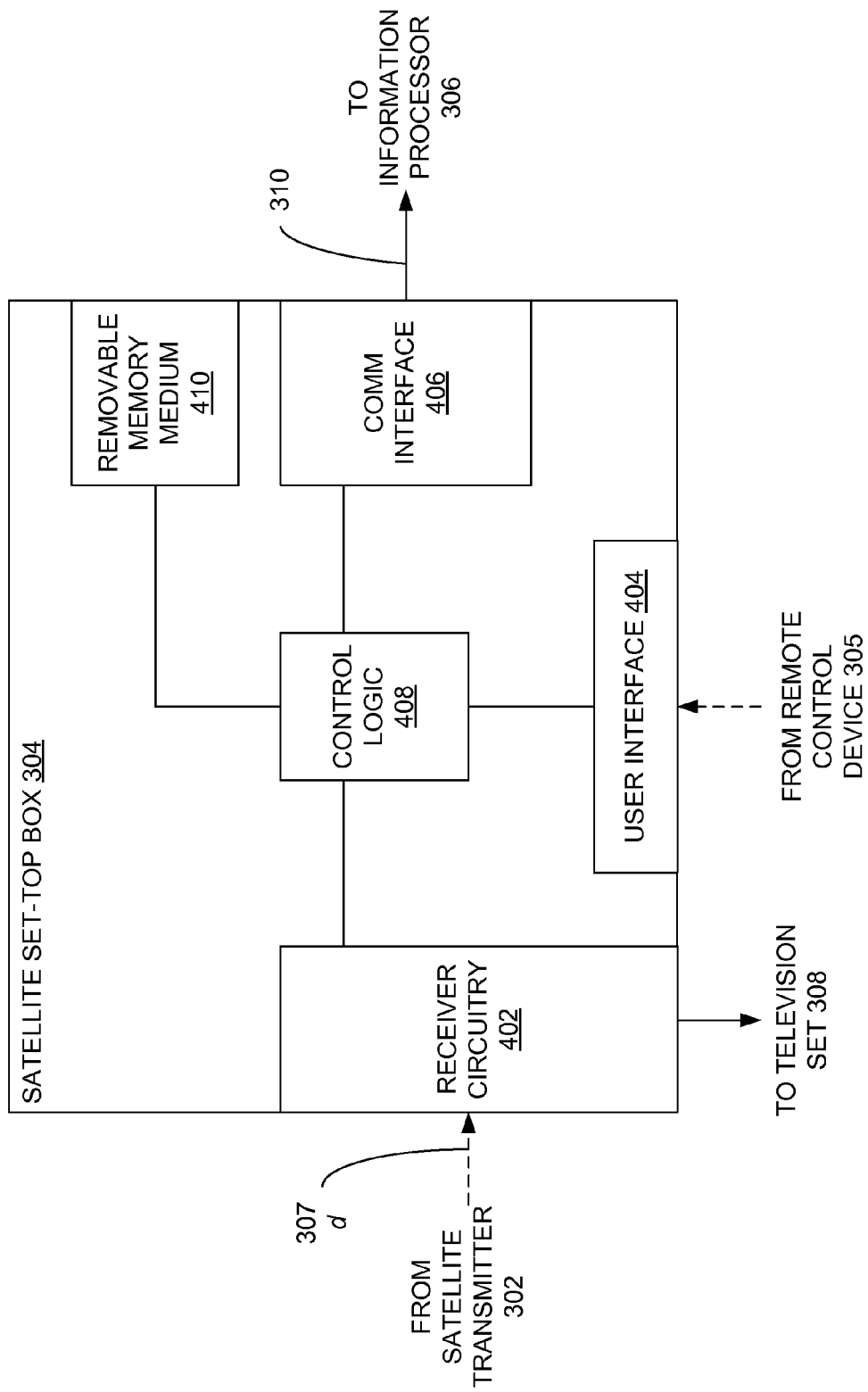
FIG. 4 is a simplified block diagram of a satellite set-top box employed in the satellite broadcast communication system of FIG. 3.

Illustrated in slightly greater detail in FIG. 4 is the set-top box 304, which includes receiver circuitry 402, a user interface 404, a communication interface 406, and control logic 408. Optionally, a removable memory medium 410, sometimes termed a "smart card" in one implementation, is installed in the set-top box 304. The functionality of the memory medium 410 is discussed further below in conjunction with the handling of information generated within the set-top box 304.

The receiver circuitry 402 receives the programming over the downlink channels 307d and performs any processing required to convert the received signals to a format displayable by the television set 308. The converted signals are then transferred to the television set 308 for presentation to the subscriber or other viewer. In one embodiment, processing the received signals may involve descrambling, decompressing and decoding the signals before converting the signals to a form acceptable to the television set 308 for display.

The user interface 404 may include both circuitry for communication with the remote control device 305 of FIG. 3 and a hand-operated panel provided on the set-top box 304 to allow the subscriber or other user to control various aspects of the operation of the set-top box 304. Typically, the user interface 404 allows the user to select a particular programming channel, view or search an electronic program guide (EPG) to select current or future programs to view or record, order PPV events, and so on. In addition, the user may order products or services promoted over one of the downlink channels 307d by way of the user interface 404. In one implementation, the products may be presented to the user via a home shopping channel or similar programming source carried over the downlink channels 307d. Some of these functions may be accessed by way of the remote control device 305 working in tandem with a control menu presented on the television set 308 to allow the user to navigate the menu.

The satellite set-top box 304 employs the communication interface 406 to periodically connect the set-top box 304 with the information processor 306. In one embodiment, the communication interface 406 includes circuitry that couples with a standard phone connection 310 utilized to communicate with the information processor 306. In other embodiments, the communication interface 406 may couple with an Internet connection, a wireless phone, or other communication means capable of connecting the set-top box 304 with the information processor 306. The role the information processor 306 plays within the system 300 is described in greater detail below.

In the embodiment of FIG. 3, the control logic 408 is coupled with each of the receiver circuitry 402, the user interface 404, the communication interface 406, and the removable memory medium 410. Generally, the control logic 408 controls and coordinates the various activities of each of these functional blocks of the set-top box 304. The control logic 408 may include electronic hardware, firmware, software, or some combination thereof. In one embodiment, the control logic 408 employs a microprocessor or microcontroller, firmware and/or software to be executed thereon, and possibly some external logic circuitry.

Among its control and coordination activities, the control logic 408 generates information related to the operation of the set-top box 304. For example, when the subscriber or other user orders a PPV event, the control logic 408 may generate information pertaining to the order, such as the identity of the PPV event. In another instance, the user may purchase an item sold through a home shopping channel received over the downlink channels 307d, as described above. In that case, the control logic 408 may store information pertaining to that purchase, such as the identity of the item, the purchase price, and the date and time of the purchase. Other information pertaining to specific actions of the user may be generated in other embodiments.

In further embodiments, the control logic 408 may generate other information relating to the operation of the set-top box 304 that is not associated with any specific user interaction with the set-top box 304. For example, the control logic 408 may generate data relating to the status or "health" of the set-top box 304 or the downlink channels 307d. In one implementation, the control logic 408 may generate data relating to errors or faults detected within the set-top box 304, as well as signal strength and data errors detected in the downlink channels 307d. The control logic 408 may generate any other information associated with the status of the set-top box 304 or the downlink channels 307d in other embodiments.

Any of the information related to the operation of the set-top box 304 that is generated by the control logic 408 may be stored in the removable memory medium 410 installed in the set-top box 304. In another embodiment, the control logic 408 may store the information in captive memory storage (not shown in FIG. 4) located within the set-top box 304.

The control logic 408 is further configured to connect the set-top box 304 to the information processor 306 by way of the communication interface 406 and the connection 310 to transfer the information generated by the control logic 408 to the information processor 306. For example, the information processor 306 may process information relating to user-initiated transactions, such as those described above relating to PPV events and product or service purchases, to bill the subscriber an appropriate amount. If the information is status information relating to the set-top box 304 or the downlink channels 307d, the information processor 306 may process that information to determine effective steps or operations to improve the status of the set-top 304 or the downlink channels 307d. In another embodiment, the information processor 306 may direct or forward the information to another system for processing.

As the connection 310 employed by the set-top box 304 to connect with the information processor 306 is often shared with other household devices, such as telephones or personal computers, the control logic 304 only periodically connects with the information processor 306 to transfer the information. Instead of basing the timing of the connection and transfer solely upon a default time determined by the set-top box 304, embodiments of the present invention allow the user to indicate one or more acceptable time periods during which the set-top box 304 is allowed to use the connection. The user may be motivated to identify these time periods based upon factors such as the user's own pattern of use of the connection 310, billing rates imposed by the connection 310 that depend on the time of day or week, and other factors.

In one embodiment, the user accesses a menu viewable through the television set 308 by way of the remote control 305 and the user interface 404 to indicate the time periods. In other examples, the user may employ a control panel of the user interface 404 employed directly on the set-top box 304. The user may directly identify the particular time periods by way of time "windows" during which connection with the information processor 306 and transfer of the information is allowed. In another implementation, the user may identify specific time periods during which connection and transfer are prohibited. In addition to the prohibited time periods, the control logic 408 may allow the user to specify time periods during which connection and transfer are preferred. Under that scenario, the control logic 408 may attempt to connect the set-top box 304 to the information processor 306 during the preferred time periods initially, but may later attempt connection outside the preferred time periods if the initial attempts were unsuccessful.

With respect to any of the foregoing embodiments, the control logic 408 may prevent the user from specifying time periods that are too short in duration, too infrequent, or otherwise unacceptable to provide timely transfer of the information to the information processor 306. Such action of the control logic 408 may occur if, for example, the user specifies a time period that occurs only once per week or month.

According to various embodiments of the invention as described above, the subscriber or user of a broadcast communication receiver possesses the ability to outline various allowable, preferred, or prohibited time periods for transfer of information generated within the receiver to the information processor. As a result, the user maintains significant control over factors such as availability of the connection for other purposes and the cost incurred in utilizing the connection.

While several embodiments of the invention have been discussed herein, other embodiments encompassed by the scope of the invention are possible. For example, while embodiments of the invention have been described in connection with satellite broadcast set-top boxes, such as those normally associated with video and audio programming, other broadcast communication receivers, such as satellite radio receivers and cable television set-top boxes, may benefit from application of the concepts described herein. Also, aspects of one embodiment may be combined with those of alternative embodiments to create further implementations of the present invention. Thus, while the present invention has been described in the context of specific embodiments, such descriptions are provided for illustration and not limitation. Accordingly, the proper scope of the present invention is delimited only by the following claims and their equivalents.

What is claimed is:

1. A broadcast communication system, comprising:
a broadcast communication transmitter configured to transmit programming;
a broadcast communication receiver configured to:
receive the programming transmitted by the broadcast communication transmitter,
generate information relating to operation of the broadcast communication receiver,
receive from a user operating the broadcast communication receiver a user input indicating a connection time restriction, wherein the connection time restriction defines a first period of time during a day in which the broadcast communication receiver is allowed to be connected to an information processor, wherein during a second period of time the broadcast communication receiver is not allowed to be connected to the information processor, and wherein the second period of time is a remaining portion of the day that is not part of the first period of time,
connect the broadcast communication receiver to the information processor, wherein the broadcast communication receiver is connected to the information processor only during the first period of time defined by the connection time restriction, and
transfer the information relating to operation of the broadcast communication receiver to the information processor after the broadcast communication receiver has been connected to the information processor; and
the information processor configured to receive and process the information relating to operation of the broadcast communication receiver;
wherein the connection time restriction further comprises an indication of a third period of time within the first period of time during which connection of the broadcast communication receiver to the information processor is preferred.

2. The broadcast communication system of claim 1, wherein the broadcast communication receiver is configured to connect to the information processor over at least one of a phone connection and an Internet connection.

3. The broadcast communication system of claim 1, wherein the connection time restriction comprises at least one of an indication of the first period of time during which the broadcast communication receiver is allowed to be connected to the information processor, and an indication of the second period of time during which the broadcast communication receiver is not allowed to be connected to the information processor.

4. The broadcast communication system of claim 1, wherein the broadcast communication receiver is configured to store the information before connecting to the information processor in a removable memory medium installed in the broadcast communication receiver.

5. The broadcast communication system of claim 1, wherein the information comprises at least one of information associated with pay-per-view programming ordered through the broadcast communication receiver, information associated with a purchase ordered through the broadcast communication receiver, and status information associated with the programming or the broadcast communication receiver.

6. A broadcast communication receiver, comprising:
receiver circuitry configured to receive programming transmitted by a broadcast communication transmitter;
a user interface configured to accept a user input from a user who is using the broadcast communication receiver, wherein the user input includes information indicating a connection time restriction, and wherein the connection time restriction defines a first period of time during which the broadcast communication receiver is allowed to be connected to an information processor;
a communication interface configured to connect to an information processor, wherein the broadcast communication receiver is connected to the information processor only during the first period of time defined by the connection time restriction, wherein during a second period of time the broadcast communication receiver is not allowed to be connected to the information processor, and wherein the second period of time is a remaining portion of the day that is not part of the first period of time; and
control logic configured to:
generate information relating to operation of the broadcast communication receiver,
connect the broadcast communication receiver to the information processor only during the period of time defined by the connection time restriction, and
initiate a transfer of the information to the information processor via the communication interface after the broadcast communication receiver has been connected to the information processor;
wherein the connection time restriction further comprises an indication of a third period of time within the first period of time during which connection of the broadcast communication receiver to the information processor is preferred.

7. The broadcast communication receiver of claim 6, wherein the communication interface is configured to connect to the information processor over at least one of a phone connection and an Internet connection.

8. The broadcast communication receiver of claim 6, wherein the connection time restriction comprises an indication of the first period of time of a day during which the broadcast communication receiver is allowed to be connected to the information processor.

9. The broadcast communication receiver of claim 6, wherein the connection time restriction comprises an indication of second period of time during which the broadcast communication receiver is not allowed to be connected to the information processor.

10. The broadcast communication receiver of claim 6, wherein the control logic is further configured to store the information before connecting the broadcast communication receiver to the information processor in a removable memory medium installed in the broadcast communication receiver.

11. The broadcast communication receiver of claim 6, wherein the information comprises at least one of information associated with pay-per-view programming ordered through the broadcast communication receiver, information associated with a purchase ordered through the broadcast communication receiver, and status information associated with the programming or the broadcast communication receiver.

12. The broadcast communication receiver of claim 6, wherein the user interface comprises at least one of a remote control device interface and a hand-operated panel.

13. A method for handling information generated within a broadcast communication receiver, the method comprising:
receiving programming transmitted by a broadcast communication transmitter in the broadcast communication receiver;
generating information relating to operation of the broadcast communication receiver within the broadcast communication receiver;
accepting a user input at the broadcast communication receiver indicating a connection time restriction, wherein the connection time restriction defines a first period of time during which the broadcast communication receiver is allowed to be connected to an information processor, wherein during a second period of time the broadcast communication receiver is not allowed to be connected to the information processor, and wherein the second period of time is a remaining portion of the day that is not part of the first period of time;
connecting the broadcast communication receiver to an information processor only during the first period of time defined by the connection time restriction; and
transferring the information relating to operation of the broadcast communication receiver from the broadcast communication receiver to the information processor after the broadcast communication receiver has been connected to the information processor;
wherein the connection time restriction further comprises an indication of a third period of time within the first period of time during which connection of the broadcast communication receiver to the information processor is preferred.

14. The method of claim 13, further comprising receiving and processing the information at the information processor.

15. The method of claim 13, wherein connecting to the information processor is accomplished over at least one of a phone connection and an Internet connection.

16. The method of claim 13, wherein the connection time restriction comprises an indication of the first period of time during which connection of the broadcast communication receiver to the information processor is allowed.

17. The method of claim 16, wherein the connection time restriction further comprises an indication of a third period of time within the first period of time during which connection of the broadcast communication receiver to the information processor is preferred.

18. The method of claim 13, wherein the connection time restriction comprises an indication of second period of time during which connection of the broadcast communication receiver to the information processor is prohibited.

19. The method of claim 13, further comprising storing the information before connecting to the information processor in a memory medium installed in the broadcast communication receiver.

20. The method of claim 13, wherein the information comprises at least one of information associated with pay-per-view programming ordered through the broadcast communication receiver, information associated with a purchase ordered through the broadcast communication receiver, and status information associated with the programming or the broadcast communication receiver.

* * * * *